US010345923B2

(12) United States Patent
Cui et al.

(10) Patent No.: US 10,345,923 B2
(45) Date of Patent: Jul. 9, 2019

(54) INPUT METHOD, APPARATUS, AND ELECTRONIC DEVICE

(71) Applicant: BEIJING SOGOU TECHNOLOGY DEVELOPMENT CO., LTD., Beijing (CN)

(72) Inventors: Xin Cui, Beijing (CN); Shangkun Ren, Beijing (CN); Qilong Su, Beijing (CN); Yang Zhang, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 251 days.

(21) Appl. No.: 15/505,263

(22) PCT Filed: Aug. 14, 2015

(86) PCT No.: PCT/CN2015/087051
§ 371 (c)(1),
(2) Date: Feb. 21, 2017

(87) PCT Pub. No.: WO2016/037520
PCT Pub. Date: Mar. 17, 2016

(65) Prior Publication Data
US 2018/0217676 A1 Aug. 2, 2018

(30) Foreign Application Priority Data

Sep. 9, 2014 (CN) .......................... 2014 1 0456861

(51) Int. Cl.
G06F 3/048 (2013.01)
G06F 3/023 (2006.01)
(Continued)

(52) U.S. Cl.
CPC ............ *G06F 3/0237* (2013.01); *G06F 16/00* (2019.01); *G06F 16/3343* (2019.01); *G06F 16/3349* (2019.01); *G06F 17/276* (2013.01)

(58) Field of Classification Search
CPC ...... G06F 3/0237; G06F 17/276; G06F 17/30; G06F 17/30681; G06F 17/30693
(Continued)

(56) References Cited

U.S. PATENT DOCUMENTS 5,959,629 A * 9/1999 Masui ................. G06F 3/04886
345/179
6,008,799 A * 12/1999 Van Kleeck ........ G06F 3/04883
345/156

(Continued)

FOREIGN PATENT DOCUMENTS

| CN | 102646022 A | 8/2012 |
|----|-------------|--------|
| CN | 103365833 A | 10/2013 |
| CN | 104268166 A | 1/2015 |

OTHER PUBLICATIONS

The World Intellectual Property Organization (WIPO) International Search Report for PCT/CN2015/087051 dated Oct. 29, 2015 6 Pages.

*Primary Examiner* — David Phantana-angkool
(74) *Attorney, Agent, or Firm* — Anova Law Group, PLLC

(57) ABSTRACT

The present disclosure provides an input method, an apparatus and an electronic device. The input method comprises: acquiring historical dialog information about a dialog window; extracting characteristic information in the historical dialog information, wherein the characteristic information comprises a keyword; determining prediction information, wherein the prediction information comprises the keyword; based on the prediction information, acquiring an on-screen candidate word queue in an input text box in the dialog
(Continued)

window; and outputting the on-screen candidate word queue.

19 Claims, 7 Drawing Sheets

(51) Int. Cl.
*G06F 16/33* (2019.01)
*G06F 17/27* (2006.01)
*G06F 16/00* (2019.01)

(58) Field of Classification Search
USPC .......................................................... 715/816
See application file for complete search history.

(56) References Cited

U.S. PATENT DOCUMENTS

| | | | | |
|---|---|---|---|---|
| 8,374,846 | B2* | 2/2013 | Assadollahi | G06F 3/0234 |
| | | | | 704/10 |
| 8,462,118 | B2* | 6/2013 | Sharan | G06F 3/0237 |
| | | | | 345/157 |
| 8,701,032 | B1* | 4/2014 | Zhai | G06F 3/04886 |
| | | | | 715/773 |
| 8,843,845 | B2* | 9/2014 | Ouyang | G06F 3/04883 |
| | | | | 715/773 |
| 8,918,734 | B2* | 12/2014 | Suraqui | G06F 3/04883 |
| | | | | 341/22 |
| 9,081,500 | B2* | 7/2015 | Ouyang | G06F 3/04897 |
| 9,116,551 | B2* | 8/2015 | Huang | G06F 3/0236 |
| 9,128,921 | B2* | 9/2015 | Griffin | G06F 17/273 |
| 9,189,157 | B2* | 11/2015 | Pasquero | G06F 3/0237 |
| 9,317,201 | B2* | 4/2016 | Zhai | G06F 3/0237 |
| 9,323,345 | B2* | 4/2016 | Huang | G06F 3/0237 |
| 9,460,066 | B2* | 10/2016 | Qiu | G06F 17/273 |
| 9,740,667 | B2* | 8/2017 | Prasanna Dileep | G06F 17/214 |
| 9,785,630 | B2* | 10/2017 | Willmore | G06F 17/276 |
| 9,836,448 | B2* | 12/2017 | Tiitola | G06F 17/276 |
| 2002/0075309 | A1* | 6/2002 | Michelnnan | G06F 3/04812 |
| | | | | 715/764 |
| 2002/0118221 | A1* | 8/2002 | Hudson | G06F 9/453 |
| | | | | 715/711 |
| 2014/0214428 | A1 | 7/2014 | Katae | |
| 2018/0285336 | A1* | 10/2018 | Gao | G06F 17/2223 |

* cited by examiner

INPUT METHOD, APPARATUS, AND ELECTRONIC DEVICE

CROSS-REFERENCES TO RELATED APPLICATIONS

This application is a national stage patent application of PCT application No. PCT/CN2015/087051, filed on Aug. 14, 2015, which claims priority to Chinese Patent Application No. 201410456861.0, filed with the State Intellectual Property Office of People's Republic of China on Sep. 9, 2014, entitled "INPUT METHOD, APPARATUS AND ELECTRONIC DEVICE", the entire content of all of which is incorporated herein by reference.

FIELD OF THE DISCLOSURE

The present disclosure relates to the field of communication technologies, and more specifically, relates to an input method, an apparatus and an electronic device.

BACKGROUND

Pinyin input is one of the simplest input methods of Chinese characters, which has developed very fast. The first generation of Pinyin input is based on characters, i.e., a user can only input one Chinese character at a time. The second generation is based on words and smart adaptive tone function, which mainly relies on the dictionary associated with the input method. Currently, Pinyin input has been developed into the third generation, through which the user can input sentences, even those without being pre-defined in the input dictionary. The function of combing words has a great impact on the user-experience of the input method.

Word prediction function is an extension of the active Pinyin input method, which reduces the number of the user's active inputs and the number of key taps, and enhances the intelligence of the input method. The implementation of the input method with the word prediction function is to first acquire the last on-screen entry entered by the user in the input text box, then based on the last on-screen entry, search pre-built libraries such as a binary library to obtain an on-screen word candidate queue, and finally output the obtained on-screen word candidate queue.

However, the on-screen candidate word queue of the input method with the word prediction function depends only on the words in the last on-screen entry, which may cause the predicted on-screen candidate word queue to be one-sided or unreasonable. Furthermore, when the input text box does not contain the last on-screen entry, the on-screen candidate word queue may not be provided to the user.

BRIEF SUMMARY OF THE DISCLOSURE

The technical problem to be solved by the present disclosure is to provide an input method capable of giving a more reasonable on-screen candidate word queue.

Accordingly, the present disclosure also provides an input apparatus and an electronic device for realizing the implementation and application of the above-described method.

To solve one or more problems set forth above, the present disclosure provides an input method, comprising:
  acquiring historical dialogue information about a dialogue window;
  extracting characteristic information in the historical dialogue information, wherein the characteristic information comprises a keyword;
  determining prediction information, wherein the prediction information comprises the keyword;
  based on the prediction information, acquiring an on-screen candidate word queue in an input text box in the dialogue window; and
  outputting the on-screen candidate word queue.

Optionally, acquiring historical dialogue information about a dialogue window includes:
  acquiring the historical dialogue information about the dialog window within a preset history timeframe; or
  acquiring a preset number of pieces of the historical dialogue information about the dialog window.

Optionally, determining prediction information includes:
  determining whether the input text box of the dialog window includes text information;
  when the input text box of the dialog window does not include the text information, determining the prediction information to be the keyword;
  when the input text box of the dialog window includes the text information, determining whether there is a topic shift between the text information and the keyword; and
  when there is no topic shift between the text information and the keyword, determining the prediction information to be the keyword and the text information.

Optionally, determining whether there is a topic shift between the text information and the keyword further includes:
  determining whether there is an overlap between scenario feature tags hit by the text information and scenario feature tags hit by the keyword;
  when there is an overlap between the scenario feature tags hit by the text information and the scenario feature tags hit by the keyword, there is no topic shift between the between the text information and the keyword; and
  when there is no overlap between scenario feature tags hit by the text information and scenario feature tags hit by the keyword, there is a topic shift between the between the text information and the keyword.

Optionally, based on the prediction information, acquiring an on-screen candidate word queue in an input text box in the dialogue window includes:
  determining the scenario feature tags hit by the prediction information;
  ranking the scenario feature tags;
  based on the prediction information, searching an associated candidate word bank of the scenario feature tags to obtain on-screen candidate words in; and
  based on the obtained on-screen candidate words, acquiring the on-screen candidate word queue in the input text box.

Optionally, ranking the scenario feature tags includes:
  ranking the scenario feature tags, according to a number of the pieces of prediction information hitting each scene feature tag, and time when the prediction information appears in the dialogue window.

Optionally, when the characteristic information extracted includes an identification word, before based on the obtained on-screen candidate words, acquiring the on-screen candidate word queue in the input text box, includes:
  categorizing and saving the identification word according to the scenarios feature tags; and
  based on a rank of the scene feature tags, obtaining the identification word with the corresponding scene feature tag, wherein the obtained identification word is take as the on-screen candidate word in the input text box.

Optionally, before based on the obtained on-screen candidate words, acquiring the on-screen candidate word queue in the input text box, the input method also includes:

based on the prediction information, searching for the on-screen candidate words in an associated candidate word bank of the language model, wherein when the prediction information includes the keyword, the keyword is taken as a left-gram, and the language model is a bigram language model, when the prediction information includes the keyword and the text information, the keyword is taken as the left-gram, the text information is taken as a middle-gram, and the language model is a trigram language model, or the text information is taken as the left-gram, and the language model is the bigram language model.

The present disclosure also provides an input apparatus, comprising:

an information acquisition unit, configured to acquire historical dialogue information about a dialogue window;

an information extraction unit, configured to extract characteristic information in the historical dialogue information, and the characteristic information may comprise a keyword;

an information determination unit, configured to determine prediction information, and the prediction information may comprise the keyword;

a predication unit, configured to; based on the prediction information, acquire an on-screen candidate word queue in an input text box in the dialogue window; and an output unit, configured to output the on-screen candidate word queue.

Optionally, the information acquisition unit is configured to:

acquire the historical dialogue information about the dialog window within a preset history timeframe; or acquire a preset number of pieces of the historical dialogue information about the dialog window.

Optionally, the information determination unit also includes:

a first judgement sub-unit, configured to determine whether an input text box of the dialog window includes any text information;

a first determination sub-unit, configured to, when the first determination sub-unit determines the input text box of the dialog window does not include the text information, determine the prediction information to be the keyword;

a second judgement sub-unit, configured to, when the first determination sub-unit determines the input text box of the dialog window includes the text information, determine whether there is a topic shift between the text information and the keyword; and a second determination sub-unit, configured to, when the second judgement sub-unit determines there is no topic shift between the text information and the keyword, determine the prediction information to be the keyword and the text information.

Optionally, the second judgement sub-unit is configured to determine whether there is an overlap between scenario feature tags hit by the text information and scenario feature tags hit by the keyword, when there is an overlap between the scenario feature tags hit by the text information and the scenario feature tags hit by the keyword, the topic shift does not occur, and when there is no overlap between the scenario feature tags hit by the text information and the scenario feature tags hit by the keyword, the topic shift occurs.

Optionally, the prediction unit also includes:

a tag determination sub-unit, configured to determine scenario feature tags hit by the prediction information;

a ranking sub-unit, configured to rank the scenario feature tags;

a first search sub-unit, configured to, based on the prediction information, search an associated candidate word bank of the scenario feature tags to obtain on-screen candidate words in; and a queue acquisition sub-unit, configured to, based on the obtained on-screen candidate words, acquire an on-screen candidate word queue in the input text box.

Optionally, the ranking sub-unit is further configured to rank the scenario feature tags, according to a number of the pieces of prediction information hitting each scene feature tag, and time when the prediction information appears in the dialogue window.

Optionally, the characteristic information extracted includes an identification word, and the prediction unit also includes:

a storage sub-unit, configured to, before the queue acquisition sub-unit acquires the on-screen candidate word queue in the input text box, categorize and save the identification words according to the scenarios feature tags; and a second search sub-unit, configured to, based on a rank of the scene feature tags, obtain the identification word with the corresponding scene feature tag, and take the obtained identification word as the on-screen candidate word in the input text box.

Optionally, the prediction unit also includes:

a third search sub-unit, configured to, before the queue acquisition sub-unit acquires the on-screen candidate word queue in the input text box, based on the prediction information, search for the on-screen candidate words in an associated candidate word bank of the language model, wherein when the prediction information includes the keyword, the keyword is taken as a left-gram, and the language model is a bigram language model, when the prediction information includes the keyword and the text information, the keyword is taken as the left-gram, the text information is taken as a middle-gram, and the language model is a trigram language model, or the text information is taken as the left-gram, and the language model is the bigram language model.

An electronic device comprising a memory and a processor, wherein the memory stores computer instructions or code, and the processor is coupled to the memory to execute computer instructions or codes stored in the memory, the electronic device is configured to perform the following method:

acquiring historical dialogue information about a dialogue window;

extracting characteristic information in the historical dialogue information, wherein the characteristic information comprises a keyword;

determining prediction information, wherein the prediction information comprises the keyword;

based on the prediction information, acquiring an on-screen candidate word queue in an input text box in the dialogue window; and outputting the on-screen candidate word queue.

The present disclosure also provides a computer program, comprising a computer readable code, when the computer readable code is run on a mobile terminal, the mobile terminal executes the above-disclosed input method.

The present disclosure also provides a computer-readable medium storing the above-disclosed computer program.

Compared to the existing technologies, the disclosed embodiments include the following advantages.

Through fully excavating the historical dialogue information about the dialogue window, determining the prediction information by integrating the characteristic information extracted from the historical dialogue information, and searching a corresponding associated candidate word bank according to the prediction information, the final on-screen candidate queue is obtained. No matter whether the input text box is blank or not, the on-screen candidate queue may still be acquired. Moreover, the acquired on-screen candidate queue is obviously more reasonable and more accurate than the on-screen candidate queue which is acquired only according to a previous on-screen entry provided by the user.

DETAILED DESCRIPTION

To make the objective, technical solutions and advantages of the present disclosure more clear, the technical solutions of the embodiments of the present disclosure will be described below with reference to the accompanying drawings.

Figure 1:
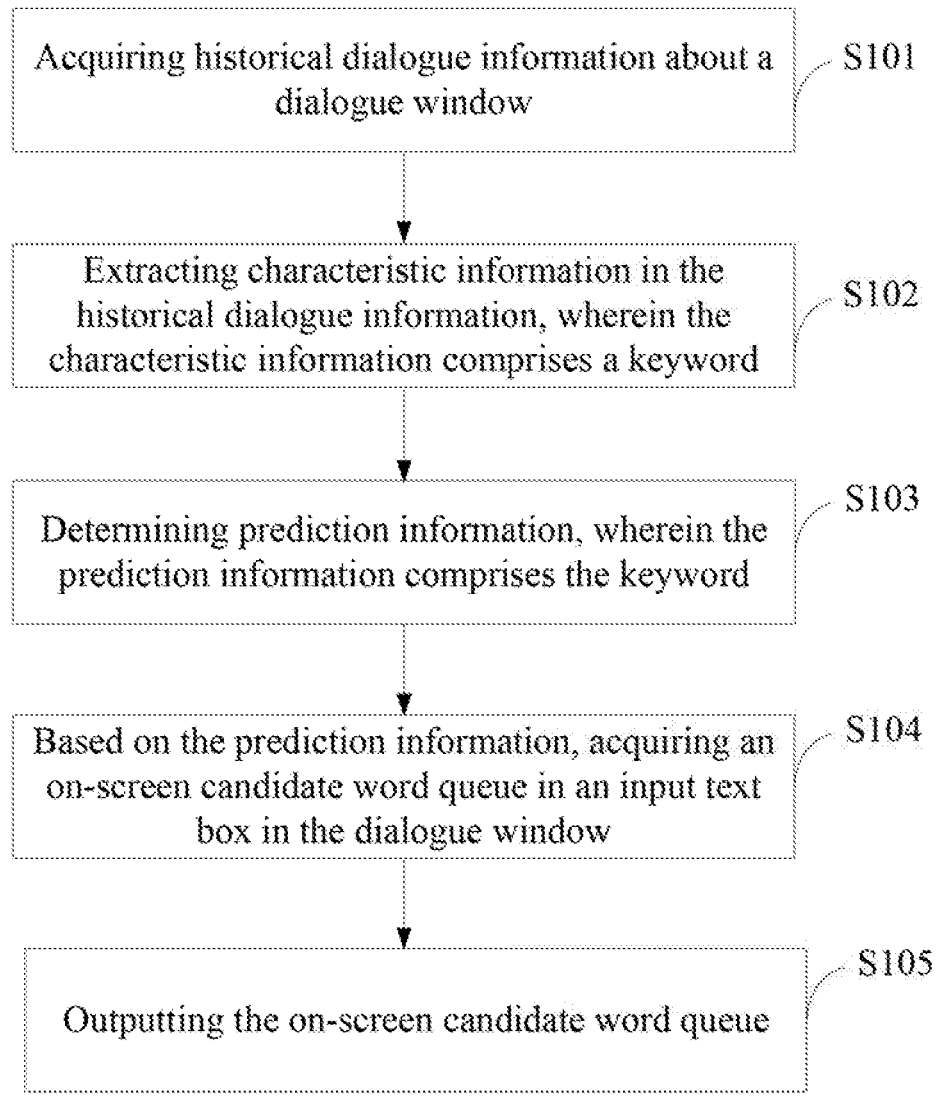
FIG. 1 illustrates a flow chart of an exemplary input method consistent with disclosed embodiments.

FIG. 1 illustrates a flow chart of an exemplary input method consistent with disclosed embodiments. As shown in FIG. 1, the input method may comprise:

Step 101, acquiring historical dialogue information about a dialogue window.

In the disclosed embodiments, the dialogue window may include a short message service (SMS) dialog window with a certain contact or a network-chat dialog window with a certain contact, or even a dialog window in different applications, for example, a dialog window generated in the last application when the applications are switched. The historical dialogue information may refer to the dialog information which has been generated and recorded in the dialogue window.

In the disclosed embodiments, the time when an on-screen candidate word queue is acquired may be set as reference time, and the historical dialogue information about the dialog window may be acquired in a period no later than the benchmark. In particular, in one embodiment, the historical dialogue information about the dialog window may be acquired within a preset historical timeframe, for example, assuming the current time is 7:00, then the historical dialogue information between 6:00 to 7:00 may be selected. In another embodiment, a preset number of pieces of historical dialogue information about the dialog window may be acquired, for example, the first three pieces of the historical dialogue information about a current input text box may be acquired. Dialog environments in different Apps may be provided with different time thresholds or different thresholds for the number of pieces of the historical dialogue information.

Step 102, extracting characteristic information in the historical dialogue information, wherein the characteristic information comprises a keyword.

The characteristic information may comprise a keyword, or both a keyword and a time point at which the keyword appears in the historical dialogue information. The characteristic information may also include an identification word extracted from the historical dialogue information.

In particular, a keyword table may be predetermined, which may be a set including a number of entries which may be used as keywords. Any entries included in the keyword table may be considered as the keyword, while those entries not included in the keyword table may not be considered as the keyword.

Each piece of historical dialogue information may be provided with a time record. The time when the keyword appears in the historical dialogue information may be the time when the historical dialogue information is generated, i.e., the time when the keyword appears in the dialog window.

The identification word may include the name of a person (e.g., Zhang San), the name of a place (e.g. Wudaokou, conference roos, etc.), other entries easy to be identified, such as the name of a business service organization (e.g., the name of a hotel), or a verification code, such as a verification code sent from Dianping. The identification word may also include the name of an App or a certain name capable of triggering the application, etc. When the identification word is extracted, obtaining relevant information of the identification word from corresponding applications or files may be triggered at the same time, for example, searching for a certain contact's phone number in the address book. The identification word may be classified and stored after being extracted. For example, the identification word may be classified and stored according to the scenario feature tag corresponding to the identification word, which will be explained in detail in the following embodiments.

Step 103, determining prediction information, wherein the prediction information may comprise the keyword.

Figure 2:
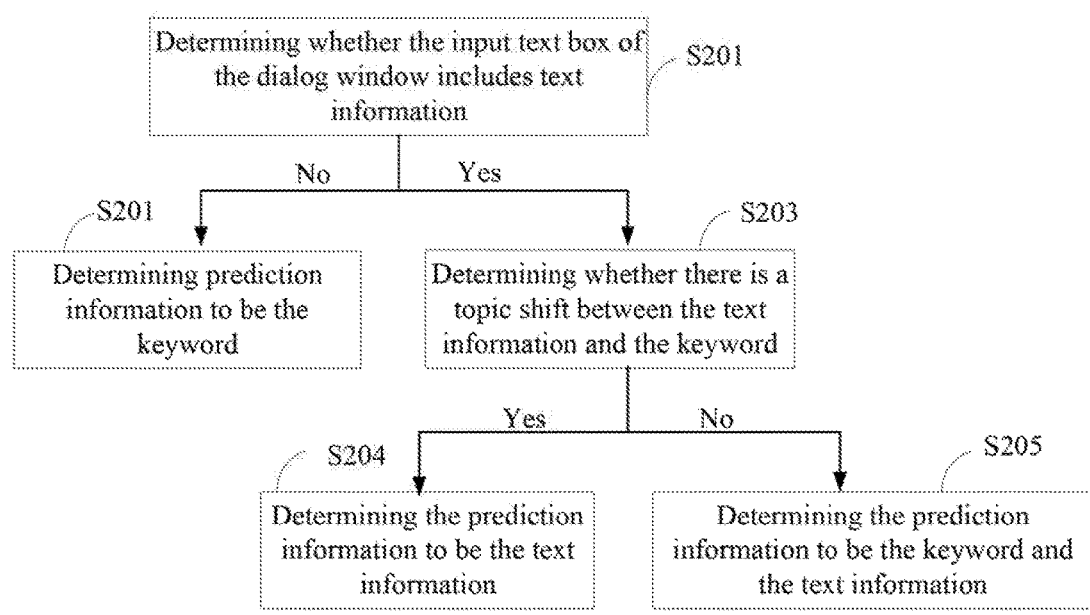
FIG. 2 illustrates a flow chart of an exemplary method for determining prediction information consistent with disclosed embodiments.

The prediction information may be used to obtain an on-screen candidate word queue in the input text box. The prediction information may vary according to various conditions. In one embodiment, the prediction information may be determined according to the method shown in FIG. 2.

Step 201, determining whether the input text box of the dialogue window includes any text information.

When the input text box of the dialog window does not include any text information, Step 202 will be performed. When the input text box of the dialog window includes the text information, Step 203 will be performed.

Step 202, determining the prediction information to be the keyword.

Step 203, determining whether there is a topic shift between the text information and the keyword.

The topic shift may be determined according to whether there is an overlap between the scenario feature tags hit by the text information and the scenario feature tags hit by the keyword. When there is an overlap between the scenario feature tags hit by the text information and the scenario feature tags hit by the keyword, the topic shift may not occur. When there is no overlap between the scenario feature tags hit by the text information and the scenario feature tags hit by the keyword, the topic shift may occur. In particular, each scenario feature tag may correspond to a scenario topic, and the same keyword or the same text information may hit different scenario feature tags. For example, the keyword "eat" may hit the "party" scenario feature tag or the "home event" scenario feature tag. The scenario feature tags may be pre-categorized and pre-determined, may include pre-determined words, or may define the corresponding characteristics of the tag. According to the similarity between the keyword and the pre-determined word, or the proximity between the keyword and the characteristics of the pre-determined tag, whether the keyword hits the scenario feature tag or not may be determined.

When there is a topic shift, Step 204 will be performed. When there is no topic shift, Step 205 will be performed.

Step 204, determining the prediction information to be the text information.

Step 205, determining the prediction information to be the keyword and the text information.

After the prediction information is determined, Step 104 may be further performed.

Step 104, based on the prediction information, acquiring an on-screen candidate word queue in an input text box in the dialogue window.

The on-screen candidate word queue in the input text box in the dialogue window may be acquired through searching an associated candidate word bank according to the scenario feature tag of the prediction information, or searching an associated candidate word bank of bigram language model and/or trigram language model according to the prediction information, or searching the pre-determined identification words. In certain embodiments, the on-screen candidate word queue in the input text box in the dialogue window may be acquired through performing the above-mentioned three searches, then combing the on-screen candidate word queues respectively obtained from the above-mentioned three searches, and determining a final on-screen candidate word queue. The details will be described in the following embodiments.

Step 105, outputting the on-screen candidate word queue.

In the disclosed embodiments, through fully excavating the historical dialogue information about the dialogue window, determining the prediction information by integrating the characteristic information extracted from the historical dialogue information, and searching a corresponding associated candidate word bank according to the prediction information, the final on-screen candidate queue may be obtained. No matter whether the input text box is blank or not, the on-screen candidate queue may still be acquired. Moreover, the acquired on-screen candidate queue may be more reasonable and more accurate than the on-screen candidate queue which is acquired only according to a previous on-screen entry provided by the user.

Next the input methods for the presence or absence of the text information in the input text box will be described.

Figure 3:
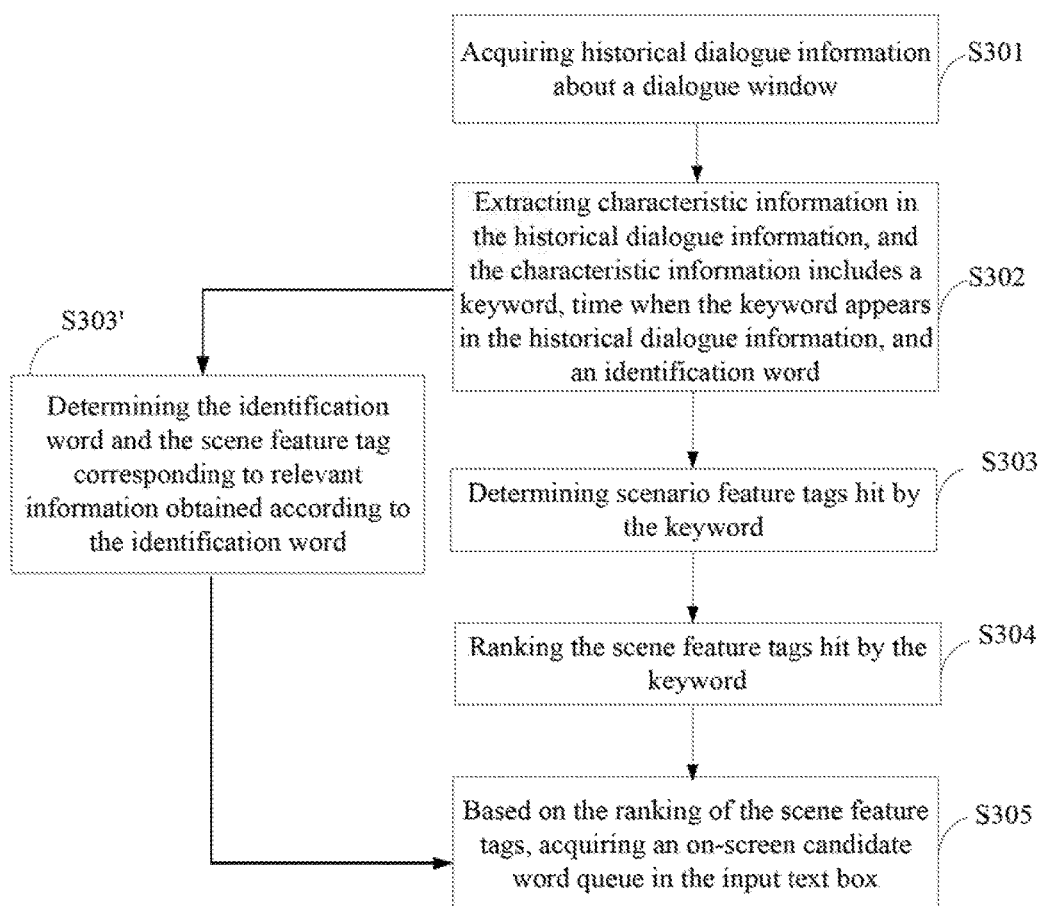
FIG. 3 illustrates a flow chart of another exemplary input method when an input text box is blank consistent with disclosed embodiments.

FIG. 3 illustrates a flow chart of another exemplary input method consistent with disclosed embodiments.

The embodiment shown in FIG. 3 describes the case where the current input text box of the dialog box is blank, i.e., there is no text information in the current input text box. The method may comprise:

Step 301, acquiring historical dialogue information about a dialogue window.

Step 301 may be similar to the above-mentioned Step 101.

Step 302, extracting characteristic information in the historical dialogue information. The characteristic information may include a keyword, time when the keyword appears in the historical dialogue information, and an identification word.

In the disclosed embodiments, the extracted characteristic information in the historical dialogue information may include the keyword, the time when the keyword appears in the historical dialogue information, and the identification word at the same time.

After the identification word is extracted, according to an application name included in the identification word or a name which is included in the identification word and capable of trigging an application, relevant information of the identification word may be obtained. For example, a GPS location may be obtained according to the identification word "location", the current time may be obtained according to the identification "now", and Zhang San's phone number may be obtained from the address book according to the identification "Zhang San's phone number", etc.

Based on the keyword and the time when the keyword appears in the historical dialogue information, Step 303 may be performed. Based on the extracted identification word and the relevant information obtained from the identification word, Step 303' may be performed to the identification word and the relevant information of the identification word.

Step 303, determining scenario feature tags hit by the keyword.

In particular, each scenario feature tag may correspond to a scenario topic, while the same keyword may hit different scenario feature tags. For example, the keyword "eat" may hit the "party" scenario feature tag or the "home event" scenario feature tag. After the scenario feature tag hit by the keyword is determined, Step 304 may be performed.

Step 304, ranking the scene feature tags hit by the keyword.

In particular, according to the number of the keywords hitting each scene feature tag, and the time when the keyword appears in the historical dialogue information, the scene feature tags hit by the keywords may be ranked. In one embodiment, the ranking may be performed by an integrated scoring method. For example, the weight may be determined according to the time when the keyword appears in the historical dialogue information, in which earlier time when the keyword appears in the historical dialogue information may correspond to a lower weight. Then an integrated weight of the keyword hitting each scene feature tag may be accumulated, in which a higher integrated weight may correspond to a higher integrated and a higher ranking.

Step 303', determining the identification word and the scene feature tag corresponding to relevant information obtained according to the identification word.

In the disclosed embodiments, after performing the Step 302 of extracting the identification word, the relevant information of the identification word may also be obtained according to the identification word, through triggering relevant application or searching relevant files. Then the identification word may be determined, and the scene feature tags corresponding to the relevant information obtained according to the identification word may also be determined.

In another embodiment, when an application or file associated with the identification word is not triggered, or the relevant information is not available for the identification word, then only the scene feature tags corresponding to the identification word may be determined.

Step 305, based on the ranking of the scene feature tags, acquiring an on-screen candidate word queue in the input text box.

After performing the Steps 304 and 303', in Step 305, based on the ranking of the scene feature tags, the identification words corresponding to the scene feature tags and the relevant information of the identification word may be acquired in order, and the identification words and the relevant information of the identification word acquired in order may form a first on-screen candidate word queue.

According to the ranking of the scene feature tags, associated candidate word banks of the scene feature tags may be searched to obtain based on the keywords, such that a second on-screen candidate word queue may be obtained. In particular, each scene feature tag may have a corresponding associated candidate word bank.

A third on-screen candidate word queue may be obtained, through searching an associated candidate word bank of bigram language model, in which the keyword is the left-gram and an on-screen candidate word is the right-gram.

The above-obtained three on-screen candidate word queues may be provided with different weights, in which the first on-screen candidate word queue may have the highest weight while the third on-screen candidate word queue may have the lowest weight. Then, the on-screen candidate words in the three on-screen candidate word queues may be combined according to the linear superposition of the weights. Through ranking the combined on-screen candidate words from the highest weight to the lowest weight, the final on-screen candidate word queue may be obtained.

In the disclosed embodiments, through fully excavating the historical dialogue information about the dialogue window, and combining the extracted keywords, and identification words, etc., the final on-screen candidate queue may be obtained based on the associated candidate word banks of the identification words, scene feature tags, and bigram language model. Even when the input text box is blank, the on-screen candidate queue may still be acquired. Moreover, the acquired on-screen candidate queue may be more reasonable and more accurate than the on-screen candidate queue which is acquired only according to a previous on-screen entry provided by the user.

Figure 4:
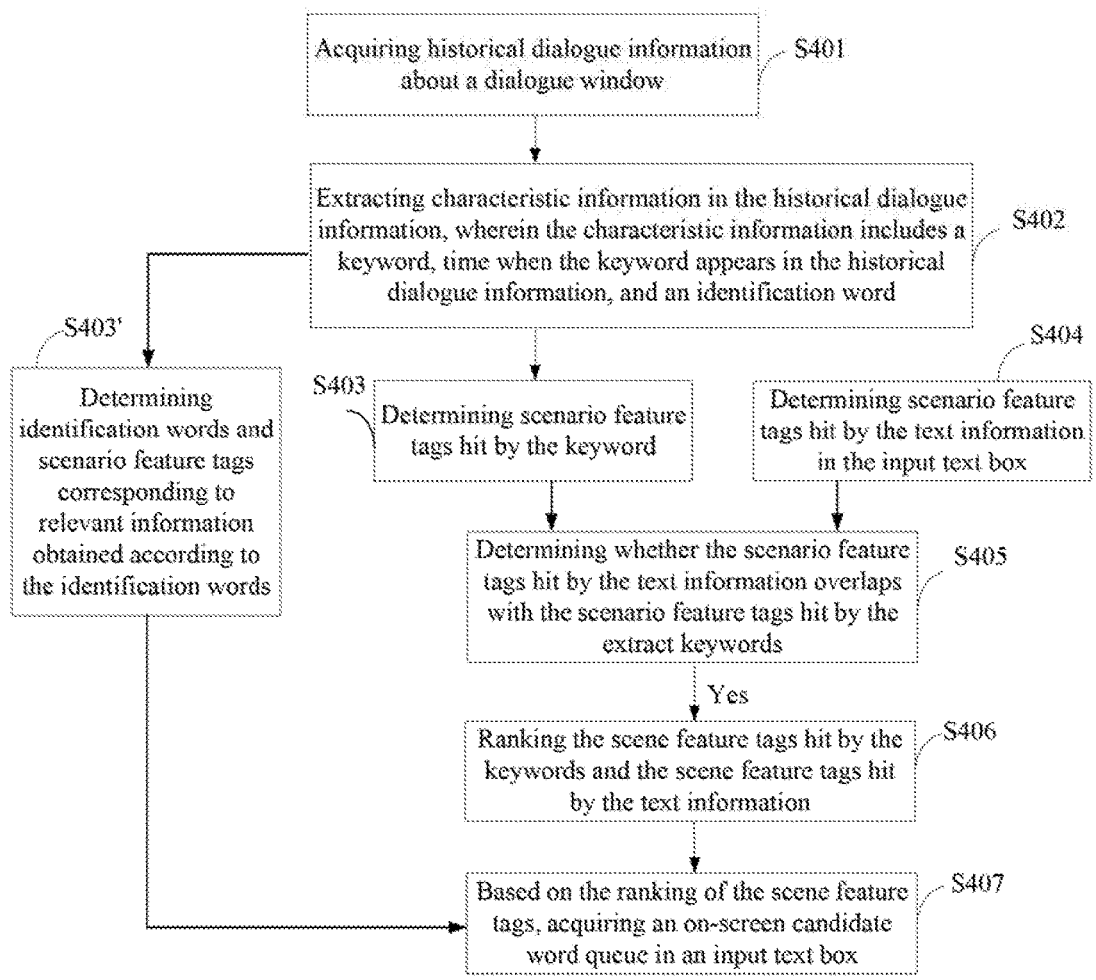
FIG. 4 illustrates a flow chart of another exemplary input method when an input text box is not blank consistent with disclosed embodiments.

FIG. 4 illustrates a flow chart of another exemplary input method consistent with disclosed embodiments.

The embodiment shown in FIG. 4 describes the case where the current input text box of the dialog box is not blank, i.e., there is text information in the current input text box. The method may comprise the following.

Step 401, acquiring historical dialogue information about a dialogue window.

Step 402, extracting characteristic information in the historical dialogue information, wherein the characteristic information may include a keyword, time when the keyword appears in the historical dialogue information, and an identification word.

Step 403, determining scenario feature tags hit by the keyword.

Step 403', determining identification words and scenario feature tags corresponding to relevant information obtained according to the identification words.

The Steps 401-403(403') may be the same as the Steps 301-303(303') in the embodiments shown in FIG. 3, which are not repeated here.

Step 404, determining scenario feature tags hit by the text information in the input text box.

In particular, the keyword may be extracted from the text information through searching pre-determined keyword table, then the scenario feature tags hit by the extract keywords may be determined.

Step 405, determining whether the scenario feature tags hit by the text information overlaps with the scenario feature tags hit by the extract keywords.

Step 405 may determine whether there is an overlap between the scene feature tags hit by the keywords determined in Step 403 and the scene feature tags hit by the text information determined in Step 404. If there is no overlap, a topic shift may occur. Then the on-screen candidate queue may be obtained through performing an existing prediction method to the text information in the input text box.

If there is an overlap, the topic shift may not occur, and Step 406 will be performed.

Step 406, ranking the scene feature tags hit by the keywords and the scene feature tags hit by the text information.

In particular, after the keywords are extracted from the text information, the keywords extracted from the text information and the keywords in the historical dialog information may be ranked through the method described in the Step 304. The scene feature tags hit by both the keywords and the text information may have the top rankings.

Step 407, based on the ranking of the scene feature tags, acquiring an on-screen candidate word queue in an input text box.

After the above-mentioned Step 406 and Step 403' are performed, in Step 407, based on the ranking of the scene feature tags, the identification words with the corresponding scene feature tags as well as the relevant information of the identification words may be acquired in order, and the identification words and the relevant information of the identification words acquired in order may form a first on-screen candidate word queue.

According to the ranking of the scene feature tags, through searching associated candidate word banks of the scene feature tags based on the keywords of the text information in the input text box, a second on-screen candidate word queue may be obtained. In particular, each scene feature tag may have a corresponding associated candidate word bank.

According to the ranking of the scene feature tags, through searching associated candidate word banks of the scene feature tags based on the keywords in the historical dialog information, a third on-screen candidate word queue may be obtained. In particular, each scene feature tag may have a corresponding associated candidate word bank.

A fourth on-screen candidate word queue may be obtained, through searching an associated candidate word bank of trigram language model, in which the keyword in the historical dialog information is the left-gram, the keyword in the text information in the input text box is the middle-gram, and an on-screen candidate word is the right-gram.

A fifth on-screen candidate word queue may be obtained, through searching an associated candidate word bank of bigram language model, in which the keyword in the text information in the input text box is the left-gram, and an on-screen candidate word is the right-gram.

A sixth on-screen candidate word queue may be obtained, through searching an associated candidate word bank of bigram language model, in which the keyword in the historical dialog information is the left-gram.

The above-obtained six on-screen candidate word queues may be provided with different weights, in which the weights of the first, second, third, fourth, fifth and sixth on-screen candidate word queues may be arranged in a descending order. Then, the on-screen candidate words in the six on-screen candidate word queues may be combined according to the linear superposition of the weights. Through ranking the combined on-screen candidate words from the highest weight to the lowest weight, the final on-screen candidate word queue may be obtained.

In the disclosed embodiments, through fully excavating the historical dialogue information about the dialogue window, combining the extracted keywords and identification words, etc., and integrating the text information in the input dialog window, the final on-screen candidate queue may be obtained based on the associated candidate word banks of the identification words, scene feature tags, bigram language model, and trigram language model. When the input text box includes the text information, the acquired final on-screen candidate queue may be more reasonable and more accurate than the on-screen candidate queue which is acquired only according to a previous on-screen entry provided by the user.

Certain examples will be described in the following.

For example, in one embodiment, the historical dialog information is "where to eat?". When the current input text box is blank, keywords "where" and "eat" may be extracted from the historical dialog information, and the scenario feature tags hit by the keywords may include a location and consultation scenario feature tag, an action and activity scenario feature tag, and a food scenario feature tag. When the historical dialog information includes the merchant's identification word "Wudaokou Richang", the identification word "Wudaokou Richang" may be inquired according to the scenario feature tags, and then "Wudaokou Richang" may be provided to the user as on-screen candidate words. When the relevant identification words are not inquired, the user's current location information may be determined as "Wudaokou" according to the GPS, and merchants near "Wudaokou" may be searched for, in which "Wudaokou Richang" may be the closet merchant to the user's current location. Then "Wudaokou Richang" may be provided to the user as on-screen candidate words.

In another embodiment, the historical dialog information is also "where to eat?". When the text information of the current input text box is "Wudaokou", keywords "where" and "eat" may be extracted from the historical dialog information, in which "where" may have the location and consultation scenario feature tag, and "eat" may have the action and activity scenario feature tag, and the food scenario feature tag. A scenario feature tag sequence may be obtained through ranking. When the input text box includes the text information of "Wudaokou", "Wudaokou" may be considered as the keyword and determined as the location scenario feature tag. Such a location scenario feature tag overlaps with the location and consultation scenario feature tag of the historical dialog information, according to which the topic is determined to be not shifted. Through searching an associated candidate word bank in which "Wudaokou" is the left-gram, and "action" "activities" "food" scenario feature tags are the right-gram, an on-screen candidate word queue may be obtained. The on-screen candidate words may include, for example, "Richang".

In another embodiment, the historical dialog information is "in which conference room?". Then "which" may be extracted as the keyword, and the keyword may hit the "inquiry" scenario feature tag and the "location" scenario feature tag. "conference room" may be extracted as the identification word and, meanwhile, an inquiry of calendar software such as Outlook may be triggered. Outlook may return an upcoming conference event, through which relevant information of the identification word "conference room" may be obtained. For example, the relevant information of the identification word "conference room" may include "Tsinghua Tongheng Building D $20^{th}$ floor Aconcagua". The identification word "conference room" and the relevant information "Tsinghua Tongheng Building D $20^{th}$ floor Aconcagua" may correspond to the "location" scenario feature tag. In a search based on the scenario feature tags hit by the keyword, the identification word "conference room" and the relevant information "Tsinghua Tongheng Building D $20^{th}$ floor Aconcagua", which are corresponding to the "location" scenario feature tag, may be obtained. Then "Tsinghua Tongheng Building D $20^{th}$ floor Aconcagua" may be adopted as on-screen candidate words and added to the on-screen candidate word queue.

In another embodiment, the historical dialog information is "show me ShangKun's phone number". "phone number" and "ShangKun" may be extracted as the keyword and the identification word, respectively, and "ShangKun" may be identified through name identification. Based on the identification word, a search in the address book may be triggered, through which the identification word and the relevant information of the identification word, i.e., "ShangKun-12345678901", may be obtained. Further, "ShangKun-12345678901" may be saved in the queue of the telephone scenario feature tag. When the current text box is blank, among the telephone scenario feature tags hit by the keyword "phone number", "ShangKun-12345678901" may be provided as on-screen candidate words and added to the on-screen candidate word queue. In such a process, the user may be able to get the on-screen candidate word queue without switching between different APPs.

In another embodiment, the user may order "Shigeru Mizutani French Teppanyaki" through Dianping, and receive a SMS confirmation as follows: Dianping: the random system validation code of your order of Shigeru Mizutani French Teppanyaki is 1234. "Dianping" and "validation code" may be extracted as the keyword, and the identification word "1234" may be extracted as the identification word from the historical dialog information. The keyword "Dianping" may provide the APP environment information, "validation code" may provide, the service type in the APP environment, and the identification word "1234" may be the content. After the identification word "1234" is determined to hit the validation code scenario feature tag, the identification word may be saved in a queue of the validation code scenario feature tags. When being switched to the Dianping APP, the "verification code" text box where the input cursor locates may be obtained. When the current input text box is blank, among the validation code scenario feature tags hit by the keyword "validation code", "1234" may be provided as on-screen candidate words and added to the on-screen candidate word queue. In such a process, the user may be able to get the on-screen candidate word queue without switching between different APPs.

It should be noted that, the foregoing method embodiment is expressed as a series of action combinations for the purpose of brief description, but persons skilled in the art should know that the present invention is not limited to the described action sequence, because some steps may be performed in another sequence or simultaneously according to the present invention. Besides, persons skilled in the art should also know that the embodiment described in this specification is an exemplary embodiment, and the involved actions and modules are not mandatory in the present invention.

Figure 5:
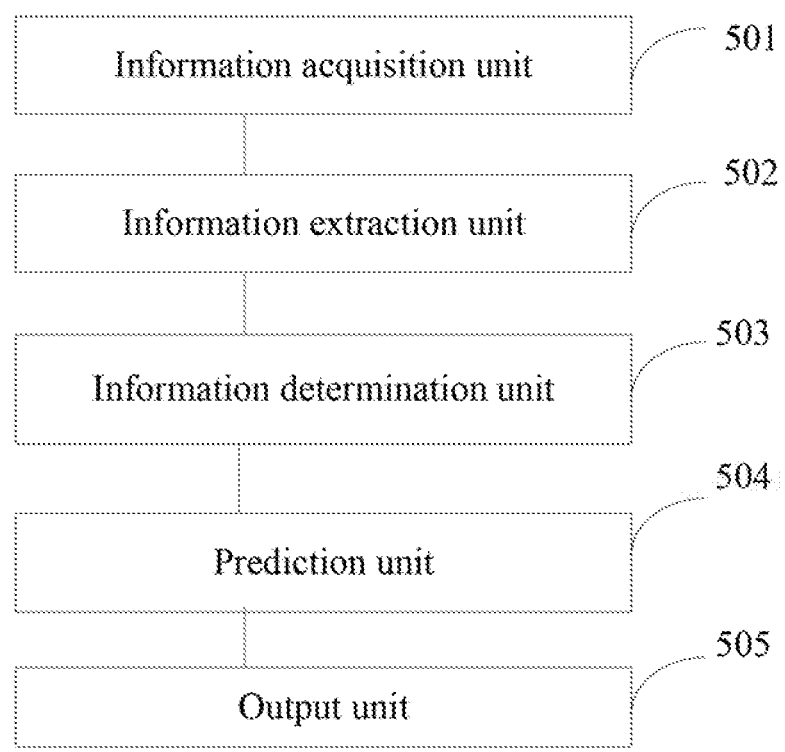
FIG. 5 illustrates a block diagram of an exemplary input device consistent with disclosed embodiments.
Figure 6:
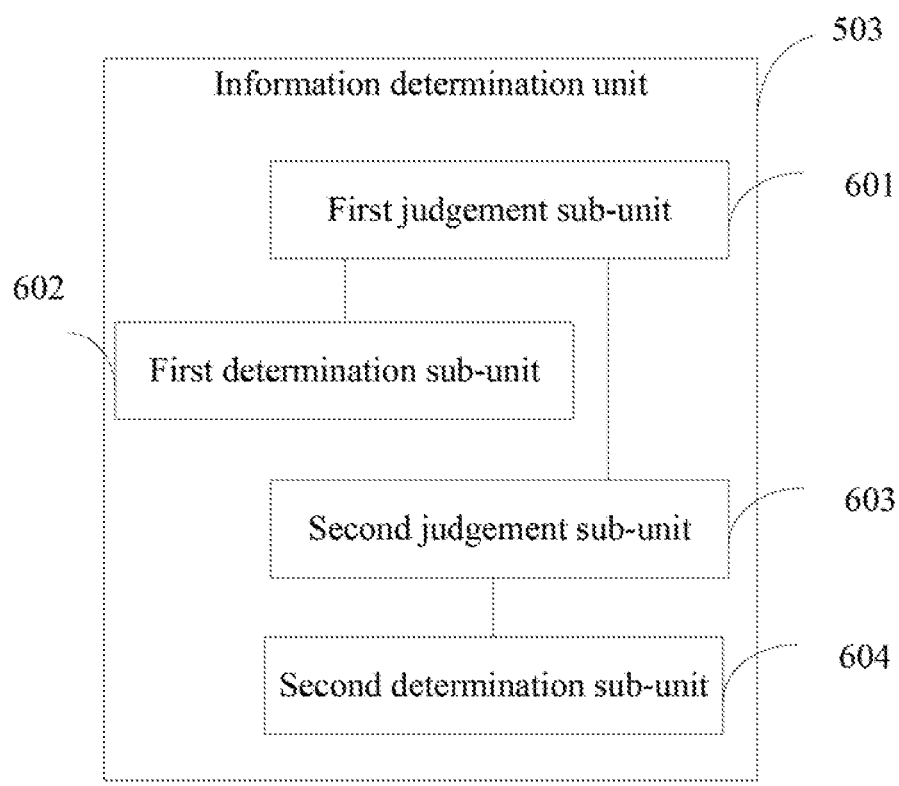
FIG. 6 illustrates a block diagram of an exemplary information determination unit consistent with disclosed embodiments.

FIG. 5 illustrates a block diagram of an exemplary input device consistent with disclosed embodiments.

As shown in FIG. 5, the input device may comprise followings:

An information acquisition unit 501, configured to acquire historical dialogue information about a dialogue window.

An information extraction unit 502, configured to extract characteristic information in the historical dialogue information, and the characteristic information may comprise a keyword.

An information determination unit 503, configured to determine prediction information, and the prediction information may comprise the keyword.

A predication unit 504, configured to; based on the prediction information, acquire an on-screen candidate word queue in an input text box in the dialogue window.

An output unit 505, configured to output the on-screen candidate word queue.

The disclosed input device may be able to fully excavate the historical dialogue information about the dialogue window, determine the prediction information by integrating the characteristic information extracted from the historical dialogue information, and search a corresponding associated candidate word bank according to the prediction information, such that the final on-screen candidate queue may be obtained. No matter whether the input text box is blank or not, the on-screen candidate queue may still be acquired. Moreover, the acquired on-screen candidate queue may be obviously more reasonable and more accurate than the on-screen candidate queue which is acquired only according to a previous on-screen entry provided by the user.

In another embodiment, the information acquisition unit 501 may be configured to acquire the historical dialogue information about the dialog window within a preset historical timeframe, or acquire a preset number of pieces of the historical dialogue information about the dialog window.

In another embodiment, the information determination unit 501 may further include:

A first judgement sub-unit 601, configured to determine whether an input text box of the dialog window includes any text information.

A first determination sub-unit 602, configured to, when the first determination sub-unit 601 determines the input text box of the dialog window does not include the text information, determine the prediction information to be the keyword.

A second judgement sub-unit 603, configured to, when the first determination sub-unit 601 determines the input text box of the dialog window includes the text information, determine whether there is a topic shift between the text information and the keyword.

A second determination sub-unit 604, configured to, when second judgement sub-unit 603 determines there is no topic shift between the text information and the keyword, determine the prediction information to be the keyword and the text information.

In particular, the second judgement sub-unit 603 may be configured to determine whether there is an overlap between the scenario feature tags hit by the text information and the scenario feature tags hit by the keyword. When there is an overlap between the scenario feature tags hit by the text information and the scenario feature tags hit by the keyword, the topic shift may not occur. When there is no overlap between the scenario feature tags hit by the text information and the scenario feature tags hit by the keyword, the topic shift may occur.

Figure 7:
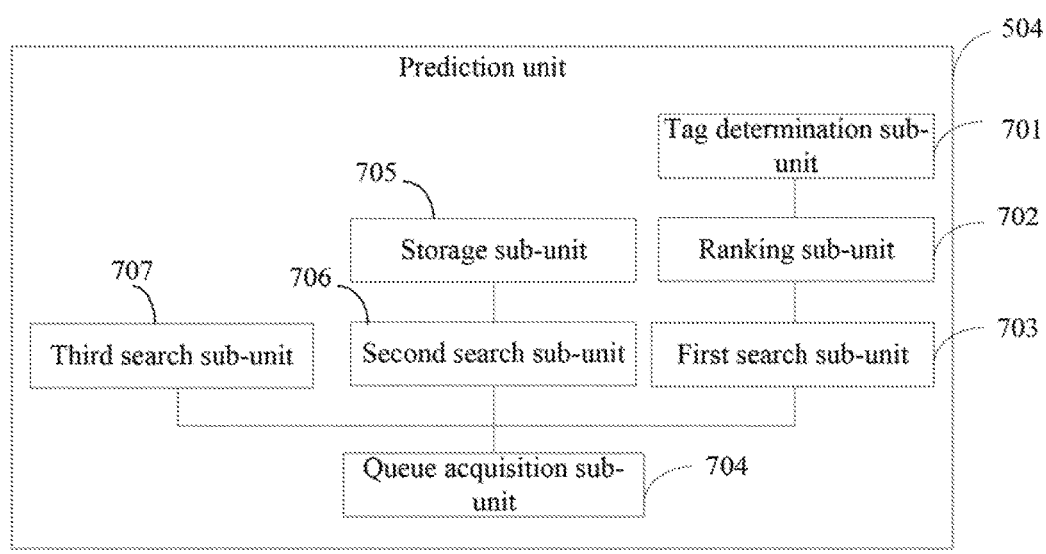
FIG. 7 illustrates a block diagram of an exemplary prediction unit consistent with disclosed embodiments.

In another embodiment, as shown in FIG. 7, the prediction unit 504 may further include:

A tag determination sub-unit 701, configured to determine scenario feature tags hit by the prediction information.

A ranking sub-unit 702, configured to rank the scenario feature tags.

A first search sub-unit 703, configured to, based on the prediction information, search an associated candidate word bank of the scenario feature tags to obtain on-screen candidate words.

A queue acquisition sub-unit 704, configured to, based on the obtained on-screen candidate words, acquire an on-screen candidate word queue in the input text box.

In particular, the ranking sub-unit 702 may be configured to rank the scenario feature tags, according to the number of the pieces of prediction information hitting each scene feature tag, and the time when the prediction information appears in the dialogue window.

Further, the characteristic information extracted by the information extraction unit 502 may include identification words, and the prediction unit 504 may further include:

A storage sub-unit 705, configured to, before the queue acquisition sub-unit 704 acquires the on-screen candidate word queue in the input text box, categorize and save the identification words according to the scenarios feature tags.

A second search sub-unit 706, configured to, based on the ranking of the scene feature tags, search for the identification words with the corresponding scene feature tag, and take the obtained identification words as the on-screen candidate words in the input text box.

A third search sub-unit 707, configured to, before the queue acquisition sub-unit 704 acquires the on-screen candidate word queue in the input text box, based on the prediction information, search for on-screen candidate words in an associated candidate word bank of the language model.

In particular, when the prediction information includes the keywords, the keyword may be taken as the left-gram, and the language model may be the bigram language model. When the prediction information includes the keywords and the text information, the keyword may be taken as the left-gram, the text information may be taken as the middle-gram, and the language model may be the trigram language model, or the text information may be taken as the left-gram, and the language model may be the bigram language model.

After the first, second, third search sub-unit acquire the on-screen candidate words, respectively, the acquired on-screen candidate words may be ranked according to a certain weight, such that a final on-screen candidate queue may be obtained.

The disclosed input device may be able to fully excavate the historical dialogue information about the dialogue window, combine the extracted keywords, and identification words, etc., such that the final on-screen candidate queue may be obtained on the associated candidate word banks of the identification words, scene feature tags, and bigram language model. No matter the input text box is blank or not, the disclosed input device may be able to obtain the on-screen candidate queue. Moreover, the acquired on-screen candidate queue may be more reasonable and more accurate than the on-screen candidate queue which is acquired only according to a previous on-screen entry provided by the user.

The present disclosure further provides an electronic device comprising a memory and a processor, in which the memory may be configured to store computer instructions or codes, and the processor may be coupled to the memory to execute computer instructions or codes stored in the memory. The electronic device is configured to perform the following method.

Acquiring historical dialogue information about a dialogue window.

Extracting characteristic information in the historical dialogue information, wherein the characteristic information comprises a keyword.

Determining prediction information, wherein the prediction information comprises the keyword.

Based on the prediction information, acquiring an on-screen candidate word queue in an input text box in the dialogue window.

Outputting the on-screen candidate word queue.

Because the device embodiment is substantially similar to the method embodiments, the description is relatively simple, and the same and similar parts may be referred to the description of the method embodiments.

The present disclosure also provides a computer program comprising a computer readable code, when the computer readable code is run on a mobile terminal, the mobile terminal executes the disclosed input methods.

Computer-readable medium for executing the computer readable code may be recorded on the mobile terminal. The computer-readable medium may include any mechanism for storing or transmitting information in a form readable by a machine (e.g., a computer). For example, a machine-readable medium can include, but not limited to, a read only memory (ROM), a random-access memory (RAM), a magnetic disk storage media, an optical storage media, a flash memory device, or the like. In addition, a machine-readable medium can include propagated signals such as electrical, optical, acoustical or other form of propagated signals (e.g., carrier waves, infrared signals, digital signals, etc.).

Various embodiments of the present specification are described in a progressive manner, in which each embodiment focusing on aspects different from other embodiments, and the same and similar parts of each embodiment may be referred to each other.

It should be appreciated by those skilled in this art that the embodiments of this disclosure may be provided in the form of a method, system or computer program product. Therefore, the embodiments of this disclosure may be realized by complete hardware embodiments, complete software embodiments, or software-hardware combined embodiments. Moreover, this disclosure may be realized in the form of a computer program product that is applied to one or more computer-usable storage mediums (including, but not limited to disk memory, CD-ROM or optical memory) in which computer-usable program codes are contained.

This disclosure is illustrated with reference to the flow chart and/or the block diagrams of the method, device (system) and computer program product according to the embodiments of this disclosure. It should be appreciated that each flow in the flow chart and/or each block in the block diagram and/or the combination of the flows in the flow chart and the blocks in the block diagram may be realized by computer program instructions. These computer program instructions may be provided to a general-purpose computer, a special purpose computer, an embedded processor or processors of other programmable data processing devices to generate a machine which makes the instructions executed by the processors of the computers or the processors of other programmable data processing devices generate a device for realizing the functions specified in one or more flows of the flow chart or one or more blocks in the block diagram.

These computer program instructions may also be stored in a computer-readable memory which is capable of guiding a computer or another programmable data processing device to work in a given manner, thereby enabling the instructions stored in the computer-readable memory to generate a product including an instruction device for realizing the functions specified in one or more flows of the flow chart or one or more blocks in the block diagram.

These computer program instructions may also be loaded to a computer or other programmable data processing devices to execute a series of operations thereon to generate the processing realized by the computer so that the instructions executed by the computer or other programmable data processing devices offer the steps for realizing the functions specified in one or more flows of the flow chart or one or more blocks in the block diagram.

While preferred embodiments have been described herein, variations and modifications may be made on these embodiments once those skilled in the art know the basic creative concept of this disclosure. Thus, the accompanying claims is intended to cover the preferred embodiments and all the variations and modifications that fall within the scope of this disclosure.

Finally, it should be noted that, in the present disclosure, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The disclosed input method, input apparatus and electronic device are described in detail. Several examples are used for illustration of the principle and implementation manner of the present invention. The description of the preceding embodiments is only used to help understand the method and its core ideas in the present invention. Meanwhile, those skilled in the art can make variations to the specific implementation manner and application scope according to the ideas of the present invention. In conclusion, the content of this specification should not be construed as a limitation to the present invention.

What is claimed is:

1. An input method, comprising:
acquiring, by an input method application, historical dialogue information about a dialogue window of a third-party application, the historical dialogue information being information that has been generated and recorded in the dialogue window of the third-party application;
extracting, by the input method application, characteristic information in the historical dialogue information, wherein the characteristic information comprises a keyword;
determining, by the input method application, prediction information, wherein the prediction information comprises the keyword;
based on the prediction information, acquiring, by the input method application, an on-screen candidate word queue for an input text box in the dialogue window; and
outputting, by the input method application, the on-screen candidate word queue containing word candidates to be selected and entered onto the input text box in the dialogue window of the third-party application.

2. The input method according to claim 1, wherein acquiring historical dialogue information about a dialogue window further includes:
acquiring the historical dialogue information about the dialog window within a preset history timeframe.

3. The input method according to claim 1, wherein determining prediction information further includes:
determining whether the input text box of the dialog window includes text information;
when the input text box of the dialog window does not include the text information, determining the prediction information to be the keyword;
when the input text box of the dialog window includes the text information, determining whether there is a topic shift between the text information and the keyword; and
when there is no topic shift between the text information and the keyword, determining the prediction information to be the keyword and the text information.

4. The input method according to claim 3, wherein determining whether there is a topic shift between the text information and the keyword further includes:
determining whether there is an overlap between a first set of scenario feature tags hit by the text information and a second set of scenario feature tags hit by the keyword, wherein a set of the scenario feature tags hit by a word is pre-categorized and pre-determined based on a meaning or a definition of the word;
when there is an overlap between the first set of the scenario feature tags hit by the text information and the second set of the scenario feature tags hit by the keyword, there is no topic shift between the between the text information and the keyword; and
when there is no overlap between the first set of scenario feature tags hit by the text information and the second set of scenario feature tags hit by the keyword, there is a topic shift between the between the text information and the keyword.

5. The input method according to claim 3, wherein based on the prediction information, acquiring an on-screen candidate word queue in an input text box in the dialogue window further includes:
determining the scenario feature tags hit by the prediction information;
ranking the scenario feature tags;
based on the prediction information, searching an associated candidate word bank of the scenario feature tags to obtain on-screen candidate words in; and
based on the obtained on-screen candidate words, acquiring the on-screen candidate word queue in the input text box.

6. The input method according to claim 5, wherein ranking the scenario feature tags further includes:
ranking the scenario feature tags, according to a number of the pieces of prediction information hitting each scene feature tag, and time when the prediction information appears in the dialogue window.

7. The input method according to claim 5, wherein when the characteristic information extracted includes an identification word, before based on the obtained on-screen candidate words, acquiring the on-screen candidate word queue in the input text box, further includes:
categorizing and saving the identification word according to the scenarios feature tags; and
based on a rank of the scene feature tags, obtaining the identification word with the corresponding scene feature tag, wherein the obtained identification word is taken as the on-screen candidate word in the input text box.

8. The input method according to claim 5, wherein before based on the obtained on-screen candidate words, acquiring the on-screen candidate word queue in the input text box, further includes:
based on the prediction information, searching for the on-screen candidate words in an associated candidate word bank of the language model,
wherein when the prediction information includes the keyword, the keyword is taken as a left-gram, and the language model is a bigram language model,
when the prediction information includes the keyword and the text information, the keyword is taken as the left-gram, the text information is taken as a middle-gram, and the language model is a trigram language model, or the text information is taken as the left-gram, and the language model is the bigram language model.

9. An input apparatus, comprising at least one processor, the at least one processor being configured for:
acquiring, by an input method application, historical dialogue information about a dialogue window of a third-party application, the historical dialogue information being information that has been generated and recorded in the dialogue window of the third-party application;
extracting, by the input method application, characteristic information in the historical dialogue information, wherein the characteristic information comprises a keyword;
determining, by the input method application, prediction information, wherein the prediction information comprises the keyword;
based on the prediction information, acquiring, by the input method application, an on-screen candidate word queue for an input text box in the dialogue window; and
outputting, by the input method application, the on-screen candidate word queue containing word candidates to be selected and entered onto the input text box in the dialogue window of the third-party application.

10. The input apparatus according to claim 9, wherein the at least one processor is further configured for:
acquiring the historical dialogue information about the dialog window within a preset history timeframe; or
acquiring a preset number of pieces of the historical dialogue information about the dialog window.

11. The input apparatus according to claim 9, wherein the at least one processor is further configured for:
determining whether an input text box of the dialog window includes any text information;
when the input text box of the dialog window does not include the text information, determining the prediction information to be the keyword;
when the input text box of the dialog window includes the text information, determining whether there is a topic shift between the text information and the keyword; and
when there is no topic shift between the text information and the keyword, determining the prediction information to be the keyword and the text information.

12. The input apparatus according to claim 11, wherein the at least one processor is further configured for:
determining whether there is an overlap between a first set of scenario feature tags hit by the text information and a second set of scenario feature tags hit by the keyword, wherein a set of the scenario feature tags hit by a word is pre-categorized and pre-determined based on a meaning or a definition of the word;

when there is an overlap between the first set of the scenario feature tags hit by the text information and the second set of the scenario feature tags hit by the keyword, there is no topic shift between the between the text information and the keyword; and when there is no overlap between the first set of scenario feature tags hit by the text information and the second set of scenario feature tags hit by the keyword, there is a topic shift between the between the text information and the keyword.

13. The input apparatus according to claim 11, wherein the at least one processor is further configured for:

determining scenario feature tags hit by the prediction information;

ranking the scenario feature tags;

searching an associated candidate word bank of the scenario feature tags to obtain on-screen candidate words in; and based on the obtained on-screen candidate words, acquiring an on-screen candidate word queue in the input text box.

14. The input apparatus according to claim 13, wherein the at least one processor is further configured for:

ranking the scenario feature tags, according to a number of the pieces of prediction information hitting each scene feature tag, and time when the prediction information appears in the dialogue window.

15. The input apparatus according to claim 13, wherein the at least one processor is further configured for:

before acquiring the on-screen candidate word queue in the input text box, categorizing and saving the identification words according to the scenarios feature tags; and based on a rank of the scene feature tags, obtaining the identification word with the corresponding scene feature tag, and taking the obtained identification word as the on-screen candidate word in the input text box.

16. The input apparatus according to claim 13, the at least one processor is further configured for:

before acquiring the on-screen candidate word queue in the input text box, based on the prediction information, searching for the on-screen candidate words in an associated candidate word bank of the language model, wherein when the prediction information includes the keyword, the keyword is taken as a left-gram, and the language model is a bigram language model, when the prediction information includes the keyword and the text information, the keyword is taken as the left-gram, the text information is taken as a middle-gram, and the language model is a trigram language model, or the text information is taken as the left-gram, and the language model is the bigram language model.

17. A non-transitory computer-readable medium comprising a computer readable code for, when being executed by at least one processor of a mobile terminal, performing an input method, wherein the method comprising:

acquiring, by an input method application, historical dialogue information about a dialogue window of a third-party application, the historical dialogue information being information that has been generated and recorded in the dialogue window of the third-party application;

extracting, by the input method application, characteristic information in the historical dialogue information, wherein the characteristic information comprises a keyword;

determining, by the input method application, prediction information, wherein the prediction information comprises the keyword;

based on the prediction information, acquiring, by the input method application, an on-screen candidate word queue for an input text box in the dialogue window; and outputting, by the input method application, the on-screen candidate word queue containing word candidates to be selected and entered onto the input text box in the dialogue window of the third-party application.

18. The non-transitory computer-readable medium according to claim 17, wherein acquiring historical dialogue information about a dialogue window further includes:

acquiring the historical dialogue information about the dialog window within a preset history timeframe; or acquiring a preset number of pieces of the historical dialogue information about the dialog window.

19. The non-transitory computer-readable medium according to claim 17, wherein determining prediction information further includes:

determining whether the input text box of the dialog window includes text information;

when the input text box of the dialog window does not include the text information, determining the prediction information to be the keyword;

when the input text box of the dialog window includes the text information, determining whether there is a topic shift between the text information and the keyword; and when there is no topic shift between the text information and the keyword, determining the prediction information to be the keyword and the text information.

* * * * *